United States Patent
Clark

[15] 3,645,169
[45] Feb. 29, 1972

[54] CYCLING VALVE

[72] Inventor: Raymond Clark, Pewaukee, Wis.

[73] Assignee: Applied Power Industries, Inc., Milwaukee, Wis.

[22] Filed: Mar. 24, 1970

[21] Appl. No.: 22,150

[52] U.S. Cl.................................91/268, 91/273, 91/290, 91/308

[51] Int. Cl..................................F01l 15/16, F01l 25/06

[58] Field of Search..............91/273, 268, 290, 308, 313

[56] References Cited

UNITED STATES PATENTS

| 1,067,613 | 7/1913 | Lane | 91/273 |
| 1,219,938 | 3/1917 | Hamilton | 91/273 |
| 3,079,900 | 3/1963 | Hunnicut | 91/290 |
| 3,463,053 | 8/1969 | Leibundgut | 91/290 |

Primary Examiner—Paul E. Maslousky
Attorney—John J. Byrne

[57] ABSTRACT

A pilot-operated pneumatic cycling valve having means to isolate the pneumatic forces from the working elements of a pneumatic motor to permit an increase in cycling speeds and a horsepower savings.

2 Claims, 1 Drawing Figure

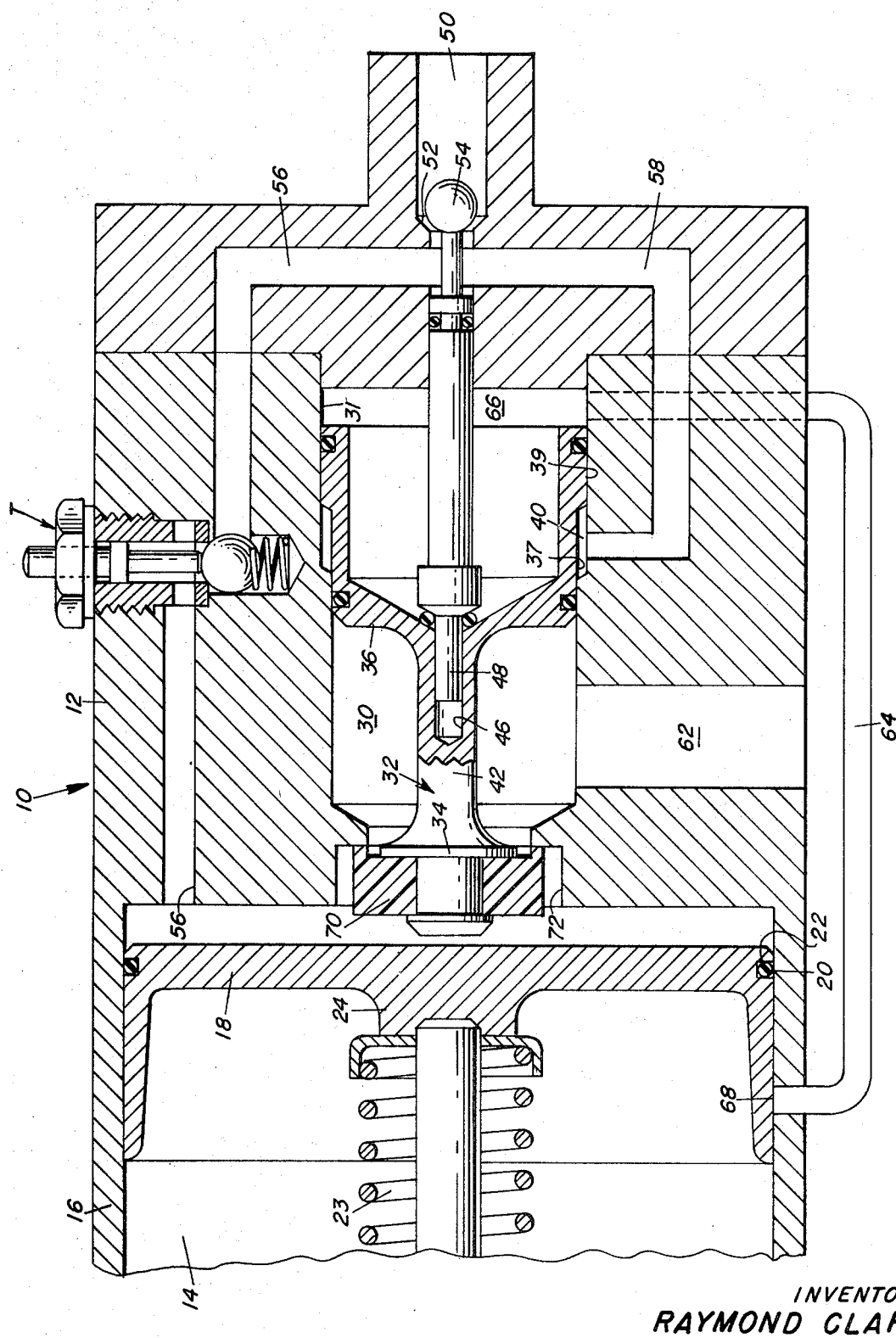

CYCLING VALVE

A principal objective of this invention is to increase the cycling speed of a fluid motor by utilizing an enlarged inlet port and reducing back pressures during the piston return cycle thereof.

Reciprocating-type motors operable by pressurized air have many uses, one of which is to drive a hydraulic pump which in turn delivers high-pressure, hydraulic fluid to various power tools. Such devices, for commercial acceptability, must be light, compact, portable, flexible in use and capable of manufacture at relatively low cost and repaired by relatively unskilled labor. An example of such a system is shown in the Atherton et al. U.S. Pat. No. 3,041,975 granted July 3, 1962. An improvement in the air motor portion of such a combination is taught by the Hunnicutt U.S. Pat. No. 3,079,900 granted on Mar. 5, 1963. The present invention has as one primary objective increasing the efficiencies of such systems.

In view of their variety of uses, motors of this type must be accurately responsive to manual control and they must have means for automatically supplying pressurized fluid to and from a piston chamber in a proper manner for efficient operation. It is accordingly a primary objective of this invention to combine an improved pilot-operated sequencing valve which effectively provides the above-mentioned requirements and increases the efficiency by conserving horsepower. This important objective is accomplished primarily by reducing airflow during the piston return cycle.

Another important objective of this invention is to increase cycling speeds of such fluid motors by utilizing an enlarged inlet and isolating back pressure from said inlet during the return stroke of the power piston. In many prior art devices, the poppet means used for sequencing valves of the type described are inconsistently seated due to pressures within the system caused by escaping air. Therefore, another important objective of this invention is to provide means for permitting the sequencing poppets to seat correctly by providing an arrangement for securing poppet valves open and closed by providing an unbalanced pressure-activated area.

A still further objective of this invention is to provide a means for preserving horsepower in systems of the type described by eliminating the continuous airflow through the pump which is common in the art.

These and other objects of the invention will become more apparent to those skilled in the art by reference to the following detailed description when viewed in light of the accompanying diagrammatic, cross-sectional drawings.

Referring now to the drawings wherein like elements are indicated by like numerals, the numeral 10 indicates a sequence valving arrangement. A valve housing 12 has a cylindrical displacement chamber 14 extending from one end thereof. The chamber is formed by a cylindrical wall 16. Reciprocally received in this displacement chamber 14 is a piston 18. Piston 18 is provided with a suitable sealing ring or packing 20. As shown in the embodiment of the drawings, the sealing means is exemplified by an O-ring confined in an annular groove 22. The O-ring slidably coacts with the inner surface of wall 16. The piston 18 is biased toward the valve housing by a compression spring 23 which is seated between the driven element, for example, the hydraulic elements of the aforementioned Atherton and Hunnicutt patents, and the reverse face of the piston. The piston 18 is formed with a pad 24 that can conveniently abut against an oil piston in an air-over-oil booster. In other words, as the piston 18 is moved to the left, it can displace a certain amount of hydraulic fluid in a manner well known to the prior art.

The valve housing 12 is formed with a cylindrical chamber 30. Chamber 30 is enlarged at surface 31. Reciprocally received within the chamber 30 is a poppet member 32 having a valve 34 at one end thereof and a piston portion 36 at the other end thereof. The piston 36 has a first periphery 37 closely received by the inner surface of chamber 30 and a second periphery 39 closely received by the surface 31. A differential pressure chamber 40 is thus formed between the walls of the chamber and the exterior walls of the piston. The stem portion 42 of the poppet is formed with a bore 46 in which a rod 48 is reciprocally received.

That end of the valve housing remote from cylinder 16 is formed with an air inlet 50 which is reduced at 52 to form a valve seat for a check ball 54. As the rod 48 reciprocates to the right, it unseats the ball 54 for purposes hereinafter described. Inwardly of the valve seat 52, the housing 12 is formed with a first passageway 56 which communicates the air inlet with the expansion chamber 14 and a second passageway 58 that communicates the inlet with the differential pressure chamber 40. Air in chamber 30 is exhausted through an outlet 62. The valve housing is also equipped with a bypass passageway 64 which communicates a chamber 66 with the expansion chamber 14 at a pilot orifice 68 when the piston 18 is moved (to the left) beyond the orifice 68. The poppet 32 carries an elastomeric grommet 70. The grommet closes the opening 72 when the poppet 32 is moved to the right and opens same as the poppet moves to the left. The grommet is elastomeric so as to reduce chattering and to absorb the shock of the piston in its cycle.

In operation, a constant source of air pressure is applied to the inlet 50. As the air bypasses check ball 54, it simultaneously enters the passageways 56 and 58. The air entering passageway 58 is communicable to the differential pressure area 40 with the resulting net force to the right. The effect is to force poppet 30 and the rod 48 to the right to thereby maintain the check ball 54 away from its valve seat 52. During this same interval, passageway 56 delivers air to the expansion chamber 14 which moves the piston 18 to the left. When the O-ring 22 moves to the left beyond the pilot orifice 68, the pressure in chamber 14 is communicated to the chamber 66 via line 64. The resulting net force acting on the poppet 30 is then to the left. This causes the poppet to move to the left. Rod 48 moves inwardly in the bore 46 and out of contact with the ball 54 and the valve seat 52 is closed. The passageway 56 has a throttle button assembly T disposed along its length. The throttle assembly T is the structural and operable equivalent of the button assembly 20 taught by the Hunnicut patent.

As grommet 70 is moved to the left, the air within the expansion chamber 14 is permitted to escape through the outlet 62. Since ball 54 is seated, the air inrush is stopped during the exhaust of the air from chamber 14 through outlet 62. With the decay of air pressure in chamber 14, the spring 22 returns the piston toward the valve housing. As the piston 18 approaches the poppet, the piston will again seal pilot orifice 68 from chamber 66. The ball 54 is again removed from the seat 52 by rod 48 and the cycle is repeated.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

I claim:

1. A pilot-operated cycling valve comprising, a housing having a fluid inlet communicating with fluid under pressure and having first and second axially spaced cylinders therein and an opening communicating said cylinders, a first piston reciprocably received in said first cylinder and defining an expansion chamber therewith, an outlet in said second cylinder in communication with said expansion chamber through said opening, a poppet valve reciprocally received in said second cylinder and movable between first and second positions to respectively open and close said opening, a first passageway communicating said inlet with said expansion chamber to introduce fluid under pressure thereto for moving said piston, a second valve between said inlet and said first passageway movably between open and closed positions, means carried by said poppet valve for holding said second valve in the open position when said poppet is in said second position, means for maintaining said poppet in said second position when said piston is being moved by said fluid under pressure, a second passageway intermediate the length of said first cylinder adapted to be uncovered when said piston is in the expanded position for communicating said expansion chamber with said second cylinder and one end of said poppet valve, whereby said poppet is moved to said first position whereby said second valve is permitted to close and said expansion chamber is communicated to said outlet.

2. The cycling valve of claim 1 wherein said means to hold said poppet valve in said second position comprises an annular chamber defined by counterbored portions on a wall of said poppet valve and a wall of said second cylinder, a portion of said counterbored portion of said poppet wall defining a fluid reaction surface, and a third passageway communicating said annular chamber with said first passageway whereby fluid pressure from said inlet reacts against said reaction surface to urge said poppet valve to said second position.

* * * * *